United States Patent [19]
Stager et al.

[11] Patent Number: 5,377,344
[45] Date of Patent: Dec. 27, 1994

[54] SELECTIVE MEMORY TRANSACTION MONITOR SYSTEM

[75] Inventors: James M. Stager, Cupertino; Hsueh-Shun Hsu, San Jose, both of Calif.

[73] Assignee: Toyo Corporation, Tokyo, Japan

[21] Appl. No.: 739,607

[22] Filed: Jul. 31, 1991

[51] Int. Cl.[5] .................. G06F 11/32; G06F 12/00
[52] U.S. Cl. .................. 395/425; 364/237.2; 364/265; 364/266; 364/266.3; 364/267.2; 364/254; 364/716; 364/927.2; 364/943.9; 364/944.9; 364/948.6; 364/947.2; 364/949.3; 345/112; 345/200; 395/162; 395/164; 395/166; 395/200; 371/21.2; 371/67.1; 371/40.4; 371/49.1
[58] Field of Search ............. 364/DIG. 1; 395/425, 395/162, 164, 166; 340/789, 798, 799

[56] References Cited

U.S. PATENT DOCUMENTS

| | | | |
|---|---|---|---|
| 4,823,108 | 4/1989 | Pope | 340/799 X |
| 4,961,153 | 10/1990 | Fredickson et al. | 340/798 X |
| 4,965,750 | 10/1990 | Matsuo et al. | 395/166 X |
| 5,033,007 | 7/1991 | Kameda | 395/162 |
| 5,056,041 | 10/1991 | Guttag et al. | 395/164 |
| 5,121,210 | 6/1992 | Hirayama | 395/166 X |
| 5,179,639 | 1/1993 | Taaffe | 395/164 X |

Primary Examiner—Joseph L. Dixon
Assistant Examiner—B. James Peikari
Attorney, Agent, or Firm—Patrick T. King

[57] ABSTRACT

A variable value monitoring system and method acquires and displays data information words having addresses within a certain range. In one mode of operation, data information words having addresses within a predetermined range are selected and stored in a shadow RAM and only changes in that data are presented to a viewer. The viewer can select the display format for a panel of data contained within the predetermined range of addresses. A FIFO memory temporarily stores the variable values of selected data information words. A flag memory stores flag bits at internal addresses corresponding to each address in a predetermined block of external addresses. Status bit are provided for each data word addressed by the predetermined block of addresses and means are provided for logically comparing the flag bits with corresponding status bits and for storing a data information word in the FIFO if the logical comparison is true. Display and permanent storage of the FIFO information are provided using a personal computer system.

2 Claims, 3 Drawing Sheets

SELECTIVE MEMORY TRANSACTION MONITOR SYSTEM

BACKGROUND OF THE INVENTION

1. Field of the invention

This invention relates to monitors for digital systems and, more particularly, is concerned with apparatus and a method for providing real-time data acquisition and real-time display of digital information words having addresses within a predefined range.

2. Prior Art

Various techniques are available for monitoring the performance of a digital hardware or software. Debugger software programs are used to debug software programs. Emulators model a system and its performance. Execution profilers are software programs which provide statistical information about activity and do not deal with actual information values. Logic analyzers are instruments which monitor the data associated with an address, but do not dynamically monitor changes in real time. Intrusive analysis code can be entered into a program for analyzing performance, but this affects the system performance.

These other technique suffer various problems and shortcomings. In general, they provide a relatively low rate of information transmission to the user; they do not have the ability to present a correlation of different data sources or kinds of data; and they have inflexible calculation and display functions. In some cases, the implementations of these techniques interfere with system functions and performance, lack the capability for real-time display, and are unable to manipulate target data values.

A need exists for a monitoring system which can capture data information having addresses within a preselected address range and which provides for display of that data information in real-time. A need also exists for a monitoring system which provides for flexible calculation and display of acquired data without interfering with the target system functions or performance.

SUMMARY OF THE INVENTION

The present invention overcomes some of the deficiencies in the prior art and satisfies the need for a monitoring system which can monitor data in real time without affecting the user's system performance.

In general, a Variable Value Monitor (VVM) data acquisition and display system according to the invention acquires and monitors preselected data information words, for example, operational data from a computer system. In one mode of operation, data having addresses within a predetermined range is selected and stored in a shadow RAM and only changes in that data are presented to a viewer. The viewer can select the display format for a panel of data contained within the predetermined range of addresses.

The invention provides a data acquisition and display system and a method for monitoring the value of variables represented by data information words, where each data information word has an address associated with it. The invention includes temporary storage means for temporarily storing the variable values of selected data information words at address locations determined by the address words in a predetermined block of addresses. Data is provided from an external data source, such as a microprocessor data bus. Corresponding external addresses are provided from an external source, such as a microprocessor address bus.

Means for selecting predetermined data information words, which have addresses within the predetermined block of addresses, are provided for temporary storage of those data information words. A flag memory stores flag bits at internal addresses corresponding to each address in the predetermined block of external. Status bit are provided for each data word addressed by the predetermined block of addresses. Means are provided for logically comparing the flag bits with corresponding status bits and for storing a data information word in the FIFO, or temporary storage means, if the logical comparison is true. Display means are provided for displaying the contents of the temporary storage means. Permanent storage means are also provided for data logging purposes. Both the display means and the permanent storage means are provided, for example, using commercially available software and personal computers.

A changed status bit is generated for indicating a change between the present and the previous values of a data information word. A change-flag bit in the flag RAM is compared with the changed status bit so that only changes in the values of the data information are stored in the temporary storage means. Use of other flag bits and comparison with corresponding status bits provides for temporary storage of various types of user data information including: all user data information, information from a user write operation, information from a user read operation, or no information. A memory is provided for storing the previous value of the data information word associated with a given address. For generating the changed status bit, a comparator compares the present value of a data information word associated with a given address with the previous value of that data information word so that the comparator provides a true value for the change status bit when the present value and the previous value differ.

A personal computer system can be used for accessing and displaying the contents of the temporary storage means. A timestamp generator provides time information to be simultaneously stored in said temporary storage means along with a data information word.

The method according to the invention includes receiving data information words from a data source and receiving address words for each of the data information words. Selection is made of a predetermined range of address words, for which the associated data information words are to be selected and monitored. Flag bits for each address of the predetermined range are stored in a flag-bit memory having internal addresses corresponding to the predetermined external address range. One or more status bits are provided for each of the data information words having addresses within the predetermined range, where each of the one or more status bits corresponds to an associated flag bit for each address in the predetermined range. The status and flag bits are provided for such functions as: monitoring all of the user data within a predetermined range, monitoring all read data, or monitoring all write data. Each flag bit is compared with an associated status bit and, if the logical comparisons are true, the associated data information word is stored in a temporary storage memory. The contents of the temporary storage memory are then displayed.

The method further includes storing a data information word having an address within the predetermined range in a RAM to provide a "previous" data information word. The stored previous data information is compared with a "current" data information word having the same address within the predetermined range. A not-equal status flag is generated if the current and previous data information words are different in value. The current data information word is stored in the temporary storage memory only if the current value differs from the previous value of the data information word.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION OF THE PREFERRED EMBODIMENTS

Reference will now be made in detail to the preferred embodiment of the invention, an example of which is illustrated in the accompanying drawings. While the invention will be described in conjunction with the preferred embodiment, it will be understood that it is not intended to limit the invention to that embodiment. On the contrary, the invention is intended to cover alternatives, modifications and equivalents, which may be included within the spirit and scope of the invention as defined by the appended claims.

Figure 1:
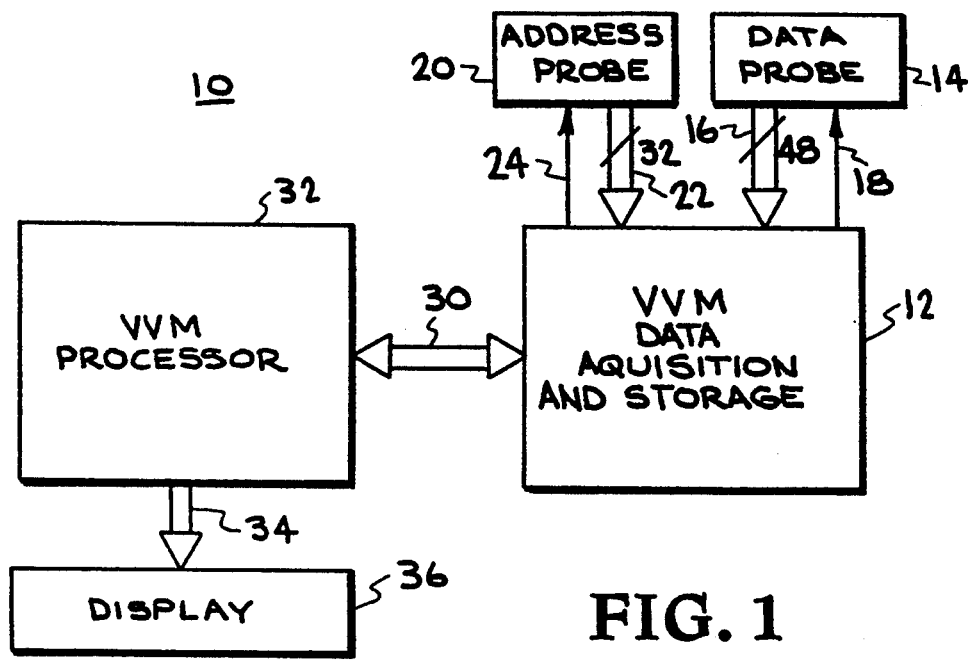
FIG. 1 is a block diagram of a variable value monitor system according to the invention.

FIG. 1 shows a block diagram of a variable value monitor (VVM) system 10, according to the invention. The VVM system 10 selects and stores predetermined blocks of data words, which have up to 48 data and status bits in each word, from an external data source such as an external 8-bit, 16-bit, or 32-bit microprocessor system. A block of data includes a number of successively addressed multi-bit data and status information words, where each of the data and status information words is identified with an address word. Each data word is associated with a unique external address. The VVM system converts a certain range of external addresses to a set of internal addresses.

The VVM system 10 includes a VVM data acquisition and storage subsystem 12. A data probe 14, which receives high-speed data and status information words from the external data source couples the data acquisition and storage subsystem 12 to the external data source. A 48-bit wide data input bus 16 couples data information words from the data probe 14 to the data acquisition and storage subsystem 12. A data threshold line 18 is provided for setting a logic threshold level in the data probe to accommodate various logic families, such as emitter-coupled logic (ECL) and transistor-transistor logic (TTL).

An address probe 20 couples address information words to the data acquisition and storage subsystem through a 32-bit wide address bus 22. These address information words identify the corresponding data information words from the data source. An address threshold-control line 24 is provided for setting a logic threshold level in the address probe to accommodate various logic families. The serial bit rate for data and address information from the external data source can be 50 megabits per second. Means are provided in the VVM data acquisition and storage subsystem 12 for deriving a system clock from either the data or the address input signals.

A bus 30 connects the VVM data acquisition and storage subsystem 12 to a VVM processor subsystem 32, which includes a microprocessor, various memories, and controllers. The bus 30 communicates interrupt signals, read-write signals, data signals, status signals, and address signals between the processor subsystem 32 and the data acquisitions and storage subsystem 12.

A bus 34 communicates the data, status, and address signals for the predetermined blocks of addresses to a display system 36, which is, for example, an Apple Computer, Inc. Macintosh personal computer system. Display of the data and status signals associated with the predetermined blocks of addresses is provided, for example, with a screen-presentation software program such as provided by National Instruments under the trademark "LabVIEW." Using this type of program, a user designs the presentation and appearance of a panel of information on the Macintosh monitor screen.

Figure 2:
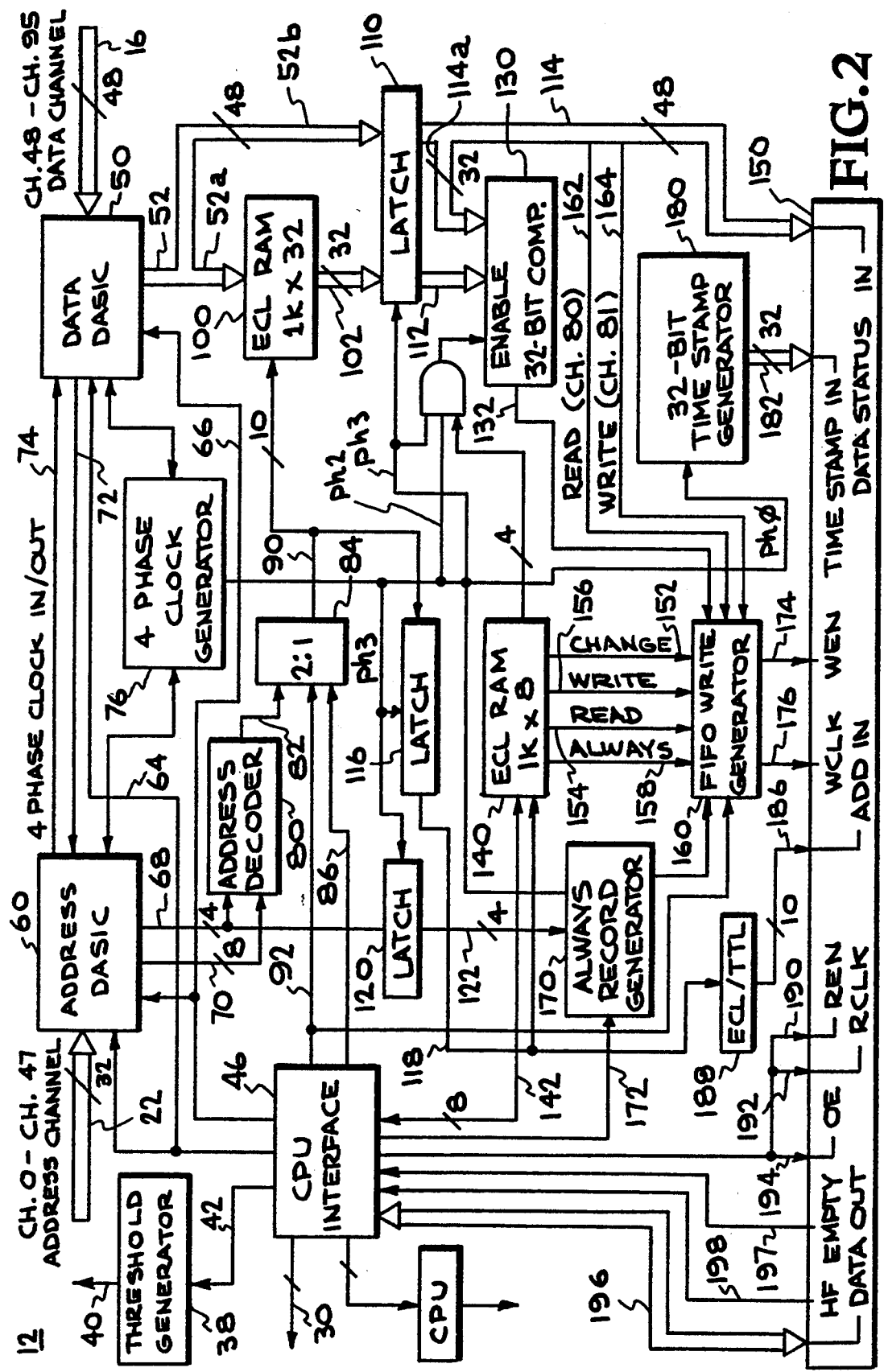
FIG. 2 is a block diagram of a data acquisition and storage subsystem of a variable value monitor system according to the invention.

FIG. 2 is a block diagram of a data acquisition and storage subsystem 12 of a VVM system 10, according to the invention. This subsystem 12 uses the data and address probes 14,20 to interface with the data, address, and status signals of various 8-bit, 16-bit, and 32-bit external microprocessors from various families of microprocessors, including the Motorola and Intel families. The signals have various digital logic thresholds as determined by their logic design technologies, such as ECL, TTL, and CMOS. A threshold generator 38 provides a threshold control signal on a control line 40 to the data and address probes. A threshold control bus 42 provides control signals from a CPU interface 46. The CPU interface 46 provides interface circuits for the bus 30, which connects the VVM data acquisition/storage subsystem 12 to the VVM processor 32.

The 48-bit wide data input bus 16 provides 32 data bits and 16 status bits to a data-acquisition application specific integrated circuit (DATA DASIC) 50. The DATA DASIC 50 is a special-purpose, application specific integrated circuit (ASIC), which is designed for use in a digital logic analyzer called the Biomation Corporation Model CLAS 4000 Logic Analyzer. A DATA DASIC 50 functions as an intelligent pipeline register. It has the capability of scanning the incoming data and status information and recognizing predetermined data word values and patterns. It also has the capability of deriving a data clock from the incoming information by monitoring, for example, a status bit which changes for each new data bit, such as, for example, an address strobe signal or a data-ready bit. In this application, the DATA DASIC 50 is used in a pipeline configuration to temporarily hold data information while the external address signals are being examined. The output data from the DATA DASIC 50 is provided on an output bus 52. The output bus 42 has two branches: branch 52A is a 32-bit bus for 32 data bits, and branch 52B is a 48-bit bus for both the 32 data bits and the 16 status bits.

The 32-bit wide external address bus 22 provides 32 external address bits to an address-acquisition application specific integrated circuit (ADDRESS DASIC) 60. The ADDRESS DASIC 60 has the same design as the DATA DASIC 50 and is also a special purpose application specific integrated circuit (ASIC), which is designed for use in a digital logic analyzer called the Biomation Corporation Model CLAS 4000 Logic Analyzer. An ADDRESS DASIC 60 also functions as an intelligent pipeline register. It scans the incoming external address words and recognizes address predetermined values as designated by the VVM processor 32 through the CPU interface 46.

The CPU interface 46 provides an address selection bus 64 and a data control bus 66 to the DATA DASIC 50 and the ADDRESS DASIC 60. The ADDRESS DASIC is programmed by the VVM processor to look for external addresses within four predetermined ranges. Each of the four predetermined ranges contains 256 addresses.

When an address is found which is within one of the four ranges, a signal for that range is provided on one line of a 4-line range bus 68. The particular address within that range of 256 bits is identified with an 8-bit address on an 8-bit bus 70.

A clock signal for the incoming external data signals is derived by the DATA DASIC 50 and provided on a signal line 72 to the ADDRESS DASIC 60. If the clock signal for the external data signals is derived by the ADDRESS DASIC 60, a clock is provided on a signal line 74 to the DATA DASIC. To accommodate the specific timing requirements for various microprocessor families, the clock signal is provided with four phase variations. A four-phase clock generator 76, which is locked to the clock signal for incoming external data signals, supplies appropriately phased clock signals to various circuits within the VVM data acquisition and storage subsystem 12, as indicated in the drawing.

The signals on the range bus 68 and the 8-bit address bus 70 are combined in an address decoder circuit 80, which combines these signals to provide an output 10-bit address signal on a 10-bit address bus 82.

The respective lines of the 10-bit address bus 58 are connected to one set of input terminals of a 2:1 multiplexer 84. A second set of input terminals of the 2:1 multiplexer 80 have connected thereto respective lines of a 10-bit bus 86 from the CPU interface 46. The VVM processor subsystem 32 can supply addresses to the acquisition/storage subsystem 12 though the bus 86. Selection of the output signals on an internal address bus 90, which is connected to the output terminals of the 2:1 multiplexer 84, is controlled by a stop signal provided on a stop-signal line 92 from the CPU interface 46.

The output terminals of the 2:1 multiplexer 84 are connected through the 10-bit internal address bus 90 to the address input terminals of a shadow memory 100, which is a 1K×32ECL RAM. The data input terminals of the shadow memory 100 are coupled to respective bit lines of the 32-bit data bus branch 52A.

In operation, during a first part of an operational sequence in which data signals from one of four preselected blocks of 256 addresses are to be monitored, the various memory locations in the shadow memory 100 are first addressed by address signals obtained from the CPU interface 46 through the bus 86. Corresponding data information words on the data bus branch 52A are loaded into the various memory locations in the shadow memory 100. Data information stored in the shadow memory 100 is identified as "previous" data, while data from the DATA DASIC 50 is identified as "current" data.

During a second subsequent part of an operational sequence, when the ADDRESS DASIC 60 finds an external-address input which falls within one of the four selected address ranges, corresponding data and status words are provided at the output of the DATA DASIC 50 on the bus 52. The new data information is provided on the data branch 52A. The chip select terminal of the shadow memory 100 is activated and the internal address signals on the bus 90 select the corresponding memory location in the shadow memory 90 and present the previously stored data information to a 32-bit shadow-memory output bus 102.

The 32-bit shadow-memory output bus 102 carries the "previous" data signals and is connected to one set of input terminals of a data latch circuit 110. A second set of input terminals of the data latch circuit 110 is connected to the "current" data and status bus 52B. A phase-3 clock signal from the 4-phase clock generator 76 latches both the current data signals and the previous data and status signals onto respective latch-output busses 112, 114.

The signals on the internal address bus 90 are provided to the input terminals of an address latch circuit I 16. A phase-3 clock signal from the 4-phase clock generator 76 latches these input signals onto a latched internal address bus 118.

The signals on the four range lines of the range bus 68 are provided to the input terminals of a range latch circuit 120. A phase-3 clock signal from the 4-phase clock generator 76 latches these signals onto a latched range bus 122.

The latched shadow-memory output bus 112 for the "previous" data is connected to one set of 32 input terminals of a 32-bit comparator 130. The other set of 32 input terminals of the 32-bit comparator 130 are connected to a 32-bit latch-output bus branch 114A for the "current" 32 data bits from the DATA DASIC 50. The 32-bit comparator does a comparison between each of the respective 32 bits of the current data word from the DATA DASIC 50 and the previous data word from the shadow memory 100. A single output line 132 from the comparator 130 provides a not-equal signal, which is in a TRUE output state only if the current value of the data information word is not equal to the previous value. Presence of the not-equal signal on line 132 indicates that the variable value represented by the data information word stored associated with an address for a particular location in the shadow memory 100 has changed from a previous value.

An ECL 1K×8 flag RAM 140 is addressed by the 10 latched internal address bits on bus 118. Flag RAM 140 has various flag bits located at each location, where the flag bits are provided for each location from the CPU interface 46 on a flag bus 142. It will subsequently be disclosed hereinafter that these flag bits are used in various combinations, as directed by the CPU, to control storage of certain ones of the current data and status information words, as provided on the 48-bit bus 114, in a 1K×96 first-in/first-out FIFO memory 150.

A change-flag bit, which is provided on a signal line 152, indicates that a changed data information word is to be stored in the FIFO 150. A read-flag bit, provided on a signal line 154, indicates that a current data information word which is identified as a read word is to be stored in the FIFO 150. A write-flag bit, provided on a signal line 156, indicates that a current data information word which is identified as a write word is to be stored in the FIFO 150. An always-flag bit, provided on a signal line 158, indicates that each current information data word is to be stored in the FIFO 150. The current data information word to be stored in the FIFO 150 must have a address within a selected address block.

Additional flag bits are provided on the flag bus 142 from the CPU interface 46, including bits to identify whether the data information is for an 8-bit, 16-bit, or 32-bit microprocessor being monitored. These bits enable the system to ignore data lines which are not active.

A FIFO-write generator 160 provides a write-enable signal WEN on a signal line 174 to the FIFO 150. The FIFO-write generator 160 also provides a write-clock WCLK on a signal line 176 to the FIFO 150. The FIFO-write generator 150 receives on signal lines 152, 154, 156, 158 the various flag bits from the flag RAM 140 for each data word addressed by the address words provided on latched address bus 118.

The FIFO-write generator 160 matches the flag signals from the flag Ram 140 with various other input signals to the FIFO-write generator. The not-equal signal on line 132 for each address is matched with the change-flag bit on line 152. The read-flag bit on signal line 154 is matched with the read status signal on line 162 from the data and status bus 114. Similarly, the write-flag bit on signal line 156 is matched with the write status signal on line 164 from the data and status bus 114. The always-flag bit overrides the other conditions called for by the other flag bits and requires writing of the data and status information into the FIFO 150. This occurs so long as the address of the information is within a proper address range block, as determined by an always-record generator 170, which is enabled by a signal on line 172 from the CPU interface 46 and a range signal on one of the latched range lines in the latched range bus 122. A phase-3 clock signal from the 4 phase clock generator 76 is provided to the FIFO-write generator 160 through a signal line and is matched with the always-flag on line 158 by the FIFO-write generator 160. The FIFO-write generator 160 functions to compare various input signals or combinations thereof to provide the write enable WEN signal on signal line 174 and the gated write-clock WCLK signal on signal line 176. The write-clock WCLK signal loads the 48-bit data and status word from bus 114 into the FIFO 150.

Other information, which is associated with a particular data information word appearing on bus 114A, is also written into the FIFO 150. This information includes 32 output bits from a timestamp generator 180, as provided on a bus 182 to the FIFO 150. The 10-bit latched internal address word, which is provided on bus 118 is also provided to the FIFO 150 on an output bus 186 of an ECL/TTL converter 188.

The CPU interface 46 provides the FIFO 150 with a read-enable REN signal on a signal line 190, a read-clock RCLK signal on a signal line 192, and an output-enable OE on a signal line 194.

During a read operation for the FIFO 150, the data, status, timestamp, and internal address information is provided on a 96-bit output bus 196 to the CPU interface. The status of the FIFO 150 is provided to the CPU interface with an empty flag on signal line 197 and a half-full flag on line 198.

Figure 3:
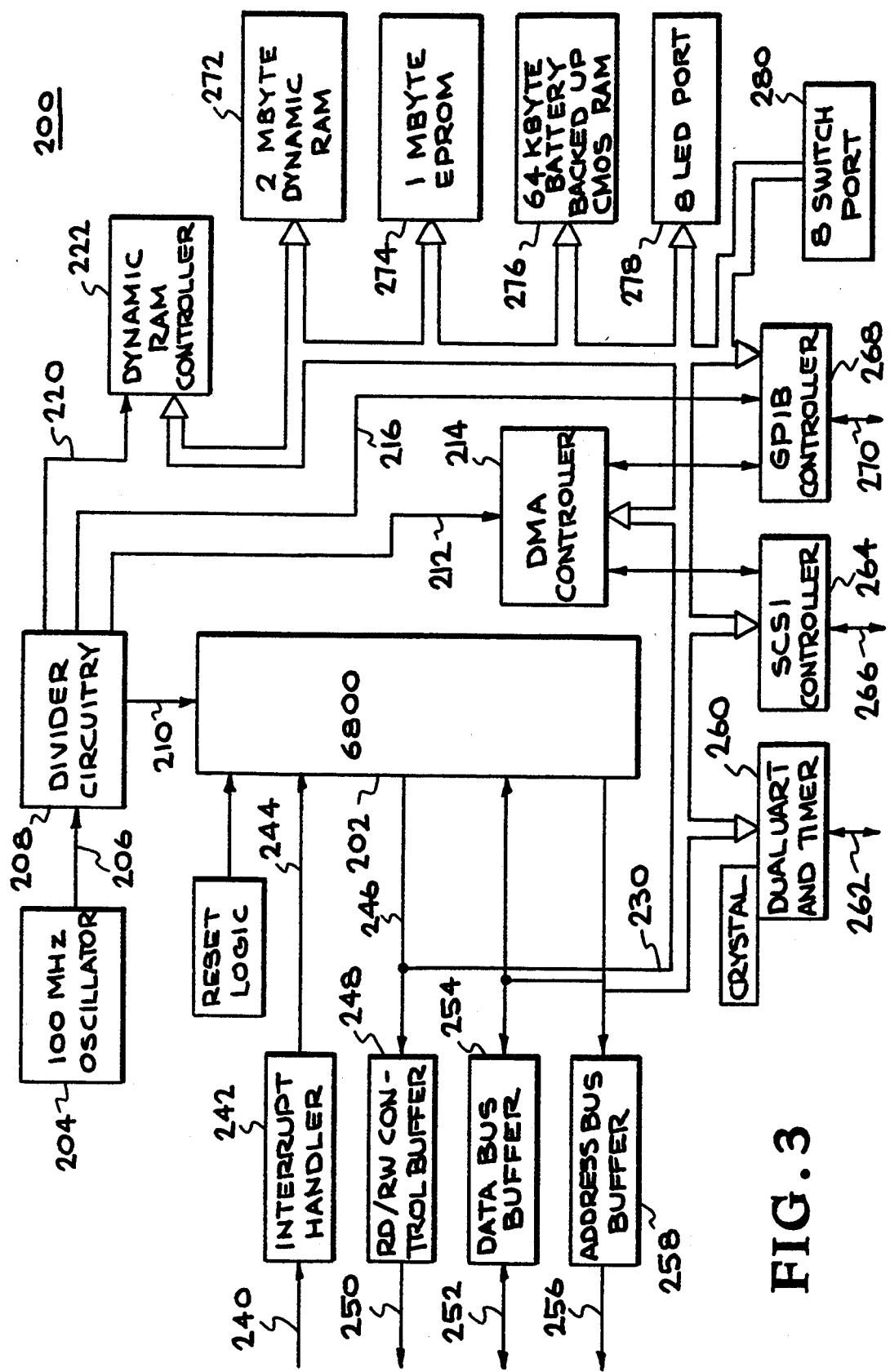
FIG. 3 is a block diagram of a microprocessor subsystem for a variable value monitor system according to the invention.

FIG. 3 is a block diagram of a microprocessor subsystem 200 for a variable value monitor system 10, according to the invention. The microprocessor subsystem 200 corresponds to the VVM processor system 32 of FIG. 1 and includes a central processor unit (CPU), or microprocessor 202, such as a 16-bit Motorola 68000 microprocessor. A 100 megahertz oscillator 204 provides a reference-frequency signal on a signal line 206 to the input terminal of a frequency divider circuit 208, which frequency divides the 100 megahertz signal to provide a 12.5 megahertz reference signal on signal line 210 to the CPU 202. A 10 megahertz signal is provided on a signal line 212 to a DMA controller 214. A 6.25 megahertz signal is provided on a signal line 216 to a DMA controller general purpose interface bus controller (GPIB) 218. A 4.17 megahertz signal is provided on a signal line 220 to a dynamic RAM controller 222.

A system bus 230, such as a VMEsystem bus, provides for interconnection of data, address, and control signals through the system. Various interconnections are made from CPU interface 46 of the VVM data acquisition and storage system of FIG. 2 to the CPU 202 and the system bus 230. A signal line 240 provides an interrupt signal to an interrupt handler circuit 242, which provides an interrupt control signal on a signal line 244 to the CPU 202. The CPU 202 provides read/write control signals on a branch 246 of the bus 230 to a read/write control buffer circuit 248, which interfaces with the CPU interface 46 through a bus 250. Data signals, which are transferred between the VVM data acquisition and storage subsystem 12 and the CPU 202 or the bus 230, are transferred on a bus 252 and through a data bus buffer circuit 254. Address signals, which are transferred between the VVM data acquisition and storage subsystem 12 and the CPU 202 on the bus 230, are transferred on a bus 256 and through an address bus buffer circuit 258.

A crystal-controlled dual UART and timer circuit 260 is connected to the bus 230 and provides for connection to an external RS232 bus 262 to which an IBM personal computer is connected for display of the monitored data. A small computer system interface SCSI controller 264 is connected to the bus 230 and provides for connection to an external Apple Macintosh system for displaying the monitored data. A general purpose interface bus GPIB controller 268 has a bus 270 available for connecting other personal computers for displaying the monitored data. The DMA controller 214 provides for direct memory access control between the bus 230 and the SCSI controller 264 and the GPIB controller 268. The UART circuit 268, the SCSI controller, and the GPIB controller 268 are used to provide monitored data to their respective personal computers and to data logging equipment to provide permanent storage for the monitored data.

The dynamic RAM controller 222 interfaces through the bus 230 with a 2 megabyte dynamic RAM 272 for the microprocessor subsystem 200. A 1 megabyte EPROM 274 is connected to the bus 230 to provide an operating program to control the microprocessor 202. A 64 kilobyte CMOS RAM 276, with a battery backup, is also connected to the bus 230 and provides a power-up program for the subsystem 200. A port 278 is connected to the bus 230 to provide eight light-emitting diodes (LEDs) for diagnostic purposes. An eight switch port 280 is also connected to the bus 230.

Figure 4:
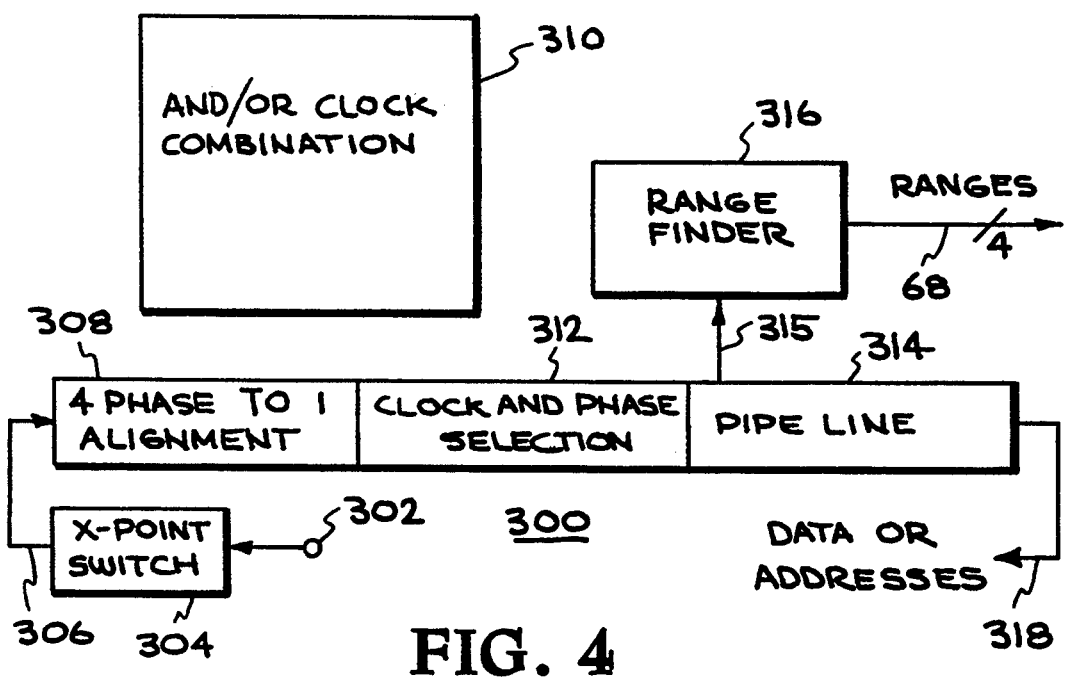
FIG. 4 is a block diagram of a DASIC module used for monitoring the address channel for addresses falling within one of four predetermined ranges.

FIG. 4 is a block diagram of a DASIC module 300, which is used as an ADDRESS DASIC 50 for monitoring the address channel for addresses falling within one of four predetermined ranges. This DASIC module is also used for the DATA DASIC as a pipeline register and for recovering the data clock from the data channel. For 32 address bits, one of these modules is provided. For the 48 data and status bits, one of these modules is provided. FIG. 4 shows one channel for one bit. An address or data bit is received by the input terminal 302 of a 48 input cross-point switch 304, which assigns all of the 48 outputs to any one of the input terminals. Each of the cross-point switches has an output terminal which is coupled by a signal line (typically shown as 306) to the input terminal of a 4-phase-to-1 alignment circuit 308 for the one channel. This circuit includes 4 serial registers through which the data bit for this channel is clocked for purposes of aligning one clock phase with the data in each stage such that the output is 4 times as wide and represents the 1/0 state of the input every 5 nsec. The other 4-phase-to-1 alignment circuits are represented by the block 310. The output signals of each of the 48 4-phase-to-1 alignment circuits are combined together in a clock combination and phase selection circuit 312, which is enabled by the CPU and dynamically assigned prior to the closest phase. The data or address bit for this channel then flows into a pipeline register block 314 which includes 10 serial registers, through which the data bit for this channel is serially transferred.

For the ADDRESS DASIC 50, the signals out of 32 of these second registers in the pipeline are each connected by a signal bus 315 to the input terminal of range detector 316. The range detector includes eight 32-bit magnitude detectors, which are programmed by the CPU, for determining whether an address falls within a preselected range of 256 bits. If an address does fall within the preselected range, one of the lines in the range bus 68, which is shown in FIG. 2, is also activated. The output signal of the pipeline register block 314 is provided on a typical output signal line 318. For the DATA DASIC 50 of FIG. 2, the typical output signal line 318 is part of the bus 52. For the ADDRESS DASIC 60 of FIG. 2, the output signal line 318 is part of bus 70.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

We claim:

1. A data acquisition and display system for monitoring changes in the values of various data words in a predetermined block of data words, comprising:

a data source providing data information words;

an address source providing an external address word corresponding to each of the data information words;

means for selecting external address words within a predetermined range and for providing a corresponding internal address for each of said data information words within said range;

random access memory (RAM) storage means for storing data information words which have an address within the predetermined range, comparator means, having a first set of comparator-input terminals coupled to the output terminals of said RAM storage means and having a second set of comparator-input terminals coupled to said data source, for comparing respective data words at respective comparator-input terminals, said comparator means having a comparator output terminal at which is provided a signal indicating that the compared data words are not equal;

flag-storage random access memory (RAM) storage means, having data input terminals respectively coupled to a source of flag-words and having addresses corresponding to the internal addresses, for writing respective flag-words from said source of flag-words into respective memory locations addressed by said internal addresses, said RAM storage means including output terminals at which are provided flag bits for each of said internal addresses;

logic means, having a first set of input terminals which are coupled to the output terminals of said flag-storage RAM storage means and having a second set of input terminals, one of which is coupled to the comparator output terminals and others of which receive status bits indicating that the input data words are from a user's read operation or a user's write operation, for providing a FIFO write clock when the signals at the output of the flag-storage RAM and the signals at the second set of input terminals are the same;

FIFO memory means, having a first set of input terminals for receiving the internal addresses, having a second set of input terminals for receiving the data source output signals, and having a write-clock terminal to receive the FIFO write clock, for storing the internal addresses and the data information signals, said FIFO memory means also including FIFO data output terminals for providing output data when a FIFO read-clock signal is provided at a FIFO read-clock terminal;

means for reading out and displaying the data information words stored in the FIFO memory means.

2. The system of claim 1 including a timestamp generator having timestamp output terminals at which is provided a timestamp digital word and wherein said FIFO includes timestamp input terminals, which are coupled to the timestamp output terminals of said timestamp generator for receiving and storing said time stamp signals corresponding to the time of storing an internal address and a corresponding data information word.

* * * * *